E. F. Keeling.

Sharpening Mach.

No. 3,719. Reissued Nov. 9, 1869.

Witnesses:

W. H. Burnings

Henry Voth

Inventor:

E. F. Keeling

N. PETERS, PHOTO-LITHOGRAPHER, WASHINGTON, D. C.

United States Patent Office.

E. F. KEELING, OF AMWELL, OHIO.

*Letters Patent No.* 33,043, *dated August* 13, 1861; *reissue No.* 3,719, *dated November* 9, 1869.

IMPROVEMENT IN HARVESTER-CUTTER GRINDER.

The Schedule referred to in these Letters Patent and making part of the same.

*To all whom it may concern:*

Be it known that I, E. F. KEELING, of Amwell, Wayne county, Ohio, (formerly of Milton, Wayne county, Ohio,) have invented certain new and useful Improvements in Machines for Grinding Harvester-Cutters; and I do hereby declare that the following is a full, clear, and exact description of the construction and operation of the same, reference being had to the annexed drawing, making part of this specification, in which—

Figure 1:
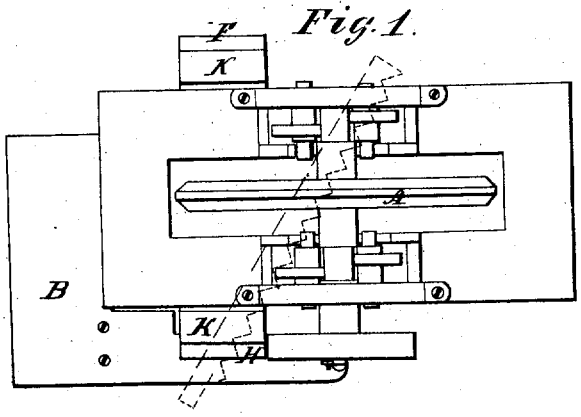
Figure 2:
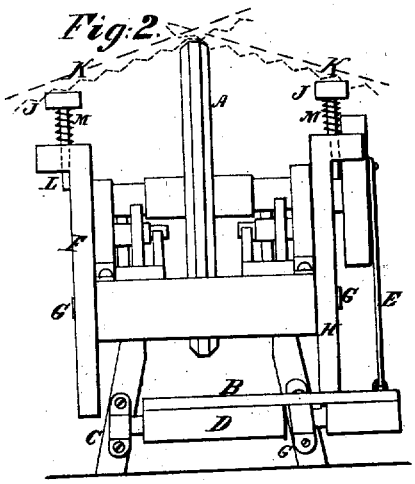

Figure 1 is a top view,

Figure 2, a front-end view, and

Figure 3:
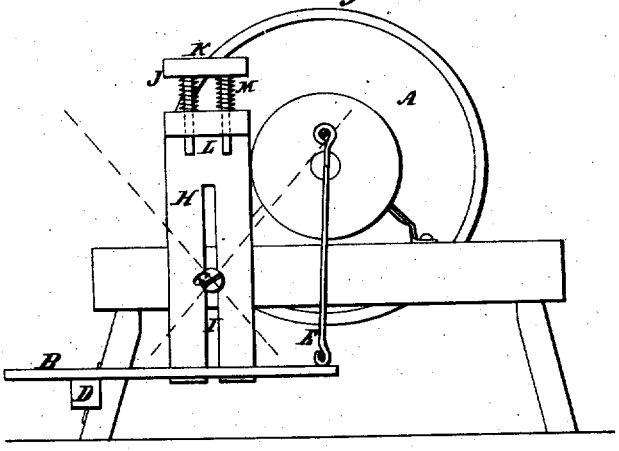

Figure 3, a side view.

Like letters denote the same parts in the several views.

My improvement relates to a machine or devices for holding and adjusting harvester-cutters to the periphery of a rotary grinder. When these cutters are ground on the side of a grindstone, it is necessary to shape the stone expressly for this object, by turning out a groove in the sides of it; consequently, when the stone is worn down, it is useless.

With my improvement, an ordinary stone may be used for this purpose until worn down to the eye.

The nature of my said invention consists in mechanism for receiving and sustaining the harvester-cutter, in combination with a revolving stone or grinder, the parts being so constructed that the grinder and cutter can be kept in contact with a yielding pressure, in order that the grinding may be uniform, and the slight inequalities of the grinder or cutters be allowed for.

A represents a grindstone, with its shaft hung upon friction-rollers, and mounted upon a frame in the usual way.

The treadle B is shown as hung or hinged to the frame, at C C, by means of a shaft, D, upon which the treadle rests. This treadle is also connected to the crank of the grindstone-shaft, by the rod E.

The adjustable standards F and H are connected to the sides of the frame by set-screws G, which pass through the slots I, fig. 3, in the standards.

The slot in each standard allows of their being raised or lowered, also inclined more or less relatively to the stone, as indicated by dotted lines, fig. 3, so as to adjust the cutters to the stone, that they may be ground at any desired angle.

By means of the set-screw, the standards are held in the desired position.

At the head of each standard is placed a spring-rest, J, which I have shown as formed of the head K, with two stems, L L, extending from the head, and around which are placed the springs M M.

The stems are secured to the head K, and pass down through holes for them in the heads of the standards.

The springs, which rest upon the heads of the respective standards, support the heads K K.

The spring-rests or standards are so adjusted as to bring the cutters in the proper position diagonally to the axis of the cylinder, and so that all the cutters will be ground at the desired uniform angle.

When the standards are adjusted, any number of cutters may be ground uniformly, without further adjusting the standards, except what little may be needed in the ordinary wear of the stone.

Different sets of cutters, varying in the angle and bevel, will need different adjustment of the standard or spring-rest.

In fig. 1, the cutters are indicated by the dotted lines on one side, as being in position for grinding. They are then changed to the opposite spring-rest, so as to grind the other side.

In fig. 2, the cutters are indicated by dotted lines in red, as being in place for grinding the opposite angle of the cutters from that shown in fig. 1.

Grinding-stones become more or less uneven in being used, so that at times it is difficult to hold the article to the grinder, and in the case of harvester-cutters, the inequality or unevenness of the stone would misshape or injure them, as they could not be properly held by hand to prevent it, owing to their weight. But by means of the springs M M, the cutters readily adjust themselves to the inequalities of the grinder, by the action of the springs under the heads K K, upon which the cutters rest.

What I claim as my invention, and desire to secure by Letters Patent, is—

1. The combination of the yielding adjustable support for the harvester-cutters, with a revolving grinder, substantially as set forth, so that the position of the cutters and cutter-bar to the axis of the grinder and the plane of its rotation may be adjusted for grinding the cutting-edges with uniformity, and at the desired angle, substantially as specified.

2. The adjustable yielding supports for the cutter-bar and cutters, arranged on each side of the plane of rotation of the grinder, substantially as specified, so that the cutters may be presented to the grinder and sharpened on opposite sides, substantially as set forth.

In witness whereof, I have hereunto set my signature, this 4th day of January, A. D. 1869.

E. F. KEELING.

Witnesses:

SAMUEL SWARTZ,

JNO. M. SWARTZ.